J. A. ORR.
LIQUID GAUGE.
APPLICATION FILED MAY 5, 1921.

1,405,798.

Patented Feb. 7, 1922.

WITNESS:
C. L. Osgood

INVENTOR.
J. A. Orr
BY
H. J. Sanders
ATTORNEY.

UNITED STATES PATENT OFFICE.

JOHN ALEXANDER ORR, OF CHICAGO, ILLINOIS.

LIQUID GAUGE.

1,405,798. Specification of Letters Patent. Patented Feb. 7, 1922.

Application filed May 5, 1921. Serial No. 467,170.

*To all whom it may concern:*

Be it known that I, JOHN A. ORR, a citizen of the United States, residing at Chicago, in the county of Cook and State of Illinois, have invented certain new and useful Improvements in Liquid Gauges, of which the following is a specification.

This invention relates to improvements in liquid gauges and more particularly to oil gauges used in automobiles, the object being primarily to provide a simple, practical gauge adapted to indicate the quantity of lubricating oil in the crank case and to conspicuously show the need of additional oil being supplied after the oil level has reached a predetermined point in the crank case. The indicator is so positioned, one end of the gauge being disposed in the floor of the automobile, that it can be instantly read by the driver at any and all times.

More specifically the invention consists in the combination and arrangement of parts to be hereinafter fully described, pointed out in the appended claims and illustrated in the accompanying drawing which forms a part of this application and in which—

Like reference characters denote corresponding parts in both views.

Figure 1:
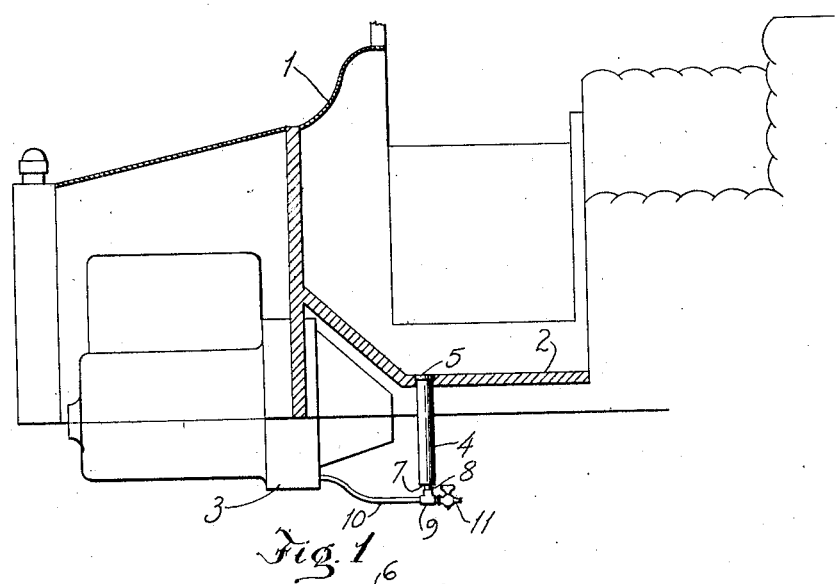
Fig. 1 is a fragmentary view of an automobile illustrating the application of my gauge.
Figure 2:
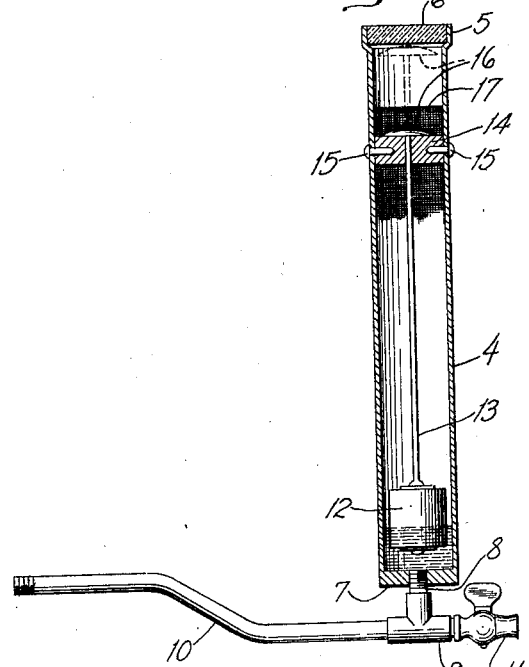
Fig. 2 is an enlarged sectional view of the gauge.

The reference numeral 1 denotes an automobile, 2 the floor thereof and 3 the crank case. I provide a cylinder 4 having the flared head 5 in which is seated the window 6. The base 7 of the cylinder is perforated to receive a nipple 8 which is connected by the T-coupling 9 to the pipe 10 that leads to the crank case. A pet cock 11 carried by the T-coupling is provided for testing purposes.

Oil from the crank case flows through the pipe 10 into the cylinder 4 and stands therein at the same level as in the crank case. A float 12 arranged in the cylinder travels on the oil therein and a stem 13 connected to said float extends up therefrom and through a perforation in the partition 14 secured by pins 15 to the cylinder wall, said stem being provided with the head or indicator 16 at its upper end between the partition 16 and window 6. As the quantity of oil in the cylinder increases the float rises and the indicator 16 moves from the partition 14 toward the window 6.

The inner surface of the cylinder wall is coated or painted preferably black as denoted by the numeral 17, the portion of the wall so painted extending from a point between the window 6 and partition 16, preferably nearer the latter, to a point beyond said partition. When the oil in the cylinder, through the medium of the float, causes the head 16 to rise above the painted portion of the cylinder wall, that wall portion is not visible through the window 6, the indication being that there is no need of additional oil but when the oil in the cylinder is low enough to cause the head 16 to expose the painted portion of the cylinder wall the signal for "more oil" is conspicuously displayed and is instantly visible by the driver of the vehicle at the wheel.

What is claimed is:—

1. In a liquid gauge, a cylinder having a perforated base, a window forming a closure for the upper end of said cylinder, a perforated partition in said cylinder, a float in said cylinder, a stem for said float extending through the perforation in said partition, a head for said stem disposed between said partition and window, the inner wall surface of said cylinder being provided with a visual signal operative, as said head moves into proximity to said partition, and a liquid supply pipe communicating with the perforated portion of said cylinder.

2. In a liquid gauge, a cylinder having a perforated base, a transparent member forming a closure for the upper end of said cylinder, a perforated partition spaced away from said transparent member in said cylinder, the inner surface of the wall of said cylinder being painted over a portion of the space between said partition and transparent member, a float in said cylinder, a stem for said float extending through the perforation in said partition, a head for said stem adapted for movement between said partition and transparent member, said head revealing the painted portion of said cylinder wall, through said transparent member, as it moves into proximity to said partition, and a liquid supply pipe communicating with the perforated portion of said cylinder base.

In testimony that I claim the foregoing as my own I have hereto affixed my signature in the presence of two subscribing witnesses.

JOHN ALEXANDER ORR.

Witnesses:
  JOE BANNON,
  ELLEN C. BEHNKE.